March 24, 1959 A. A. V. JUDGE 2,878,915

HELICAL RACEWAYS

Filed March 26, 1957 3 Sheets-Sheet 1

Inventor
Alan Alfred Victor Judge
By his Attorney

March 24, 1959 A. A. V. JUDGE 2,878,915

HELICAL RACEWAYS

Filed March 26, 1957 3 Sheets-Sheet 2

Inventor

Alan Alfred Victor Judge

By his Attorney

March 24, 1959 A. A. V. JUDGE 2,878,915

HELICAL RACEWAYS

Filed March 26, 1957 3 Sheets-Sheet 3

Inventor
Alan Alfred Victor Judge
By his Attorney 2,878,915
Patented Mar. 24, 1959

2,878,915

HELICAL RACEWAYS

Alan Alfred Victor Judge, Leicester, England, assignor to United Shoe Machinery Corporation, Flemington, N.J., a corporation of New Jersey Application March 26, 1957, Serial No. 648,538

Claims priority, application Great Britain July 19, 1956

4 Claims. (Cl.193—43)

This invention relates to means for storing and/or feeding elongated articles, and is more especially concerned with the provision of a device for feeding electrical components consecutively. While the invention is accordingly herein illustrated as employed for advancing in row formation a series of components such as resistors or capacitors which respectively have a body of cylindrical or other shape and a pair of slender leads extending in generally coaxial relation, it will be appreciated that the invention may be used in connection with the storage and/or feeding of any of a large variety of elongated work pieces and in conjunction with processing or assembling equipment of many different types.

The marked tendency of component leads to become bent and entangled makes it difficult to store and/or feed components in orderly fashion in large numbers such as are commonly required, for example, in component inserting machinery. Reasonably satisfactory feeding of components to operating instrumentalities may be provided by means of a raceway having parallel, inclined tracks at each side of a vertical plane, and which are adapted to accommodate the component bodies while supporting their leads for falling under the influence of gravity. If it becomes necessary for a component in such a raceway to fall some distance therein without immediately engaging the preceding component, as is the case when the raceway is not kept fully supplied throughout its length, the falling component often skews and becomes jammed thus blocking the feeding of subsequent components and necessitating corrective measures. The situation is somewhat alleviated by the use of stepped raceways, there then being a tendency to check the skewing at successive steps formed in the tracks or raceway guides.

In view of the foregoing, it is an object of this invention to provide an improved device for feeding elongated articles, such as electrical components having oppositely extending leads, said device to serve as a reservoir and raceway for reliably delivering from one end articles in uninterrupted succession and adapted to be loaded at its other end as convenience permits, without incurring a gap between the successive components.

To the end just stated, and in accordance with a feature of the invention, my improved raceway device consists of a cylindrical tubular column having a diameter less than the over-all length of the articles to be fed therein and providing a wall which is formed with a pair of helical guide slots oppositely disposed with respect to the axis of the column. These slots thus being inclined to the axis of the column, successive components, for example, may have their bodies contiguously and protectingly arranged therein and with their leads extending at different angles about said axis as determined by the helical slots through which they respectively project. Accordingly, as each component progresses through the novel raceway, under the influence of gravity or other motive force, it is caused to turn about the axis of the column while an edge of the respective slots engages a lead.

The above and other features of the invention, including various novel details of construction and arrangements of parts, will now be described with greater particularity in connection with an illustrative raceway in which the invention is embodied and with reference to the accompanying drawings thereof, in which—

Figure 1:
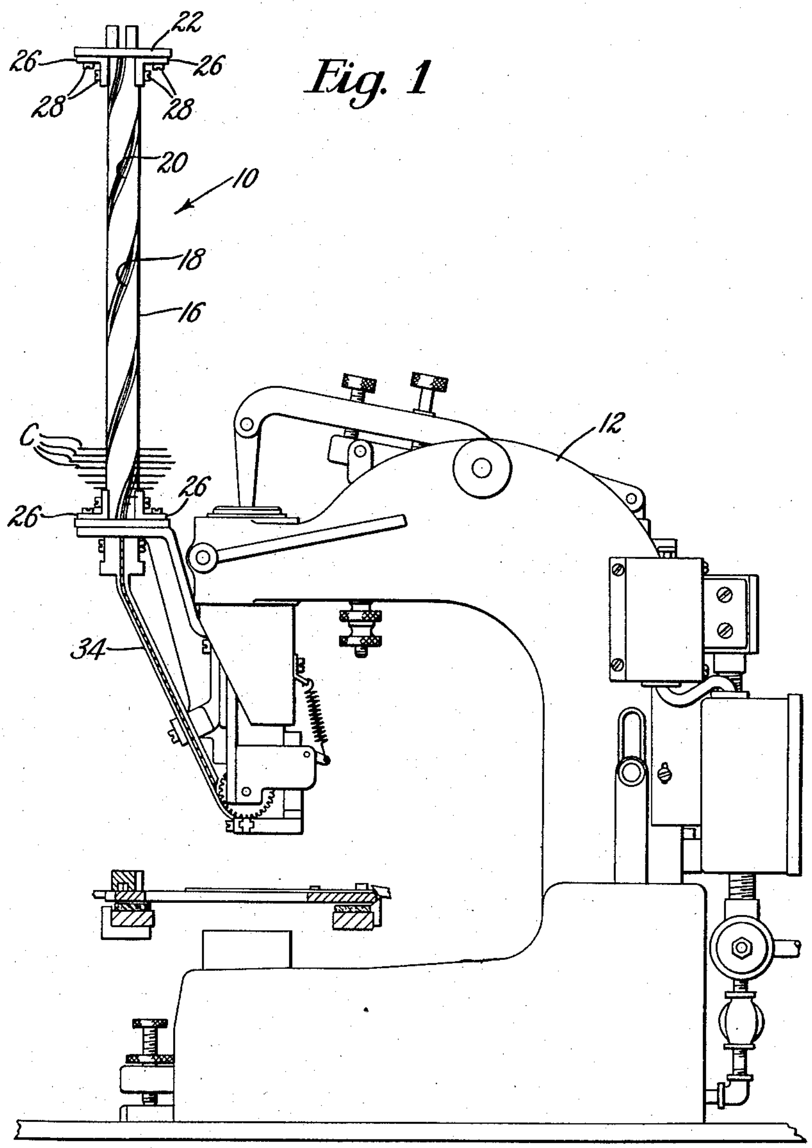
Fig. 1 is a view in side elevation of a raceway exemplifying the invention, the raceway being shown as mounted in vertical position for use with a component inserting machine.
Figure 2:
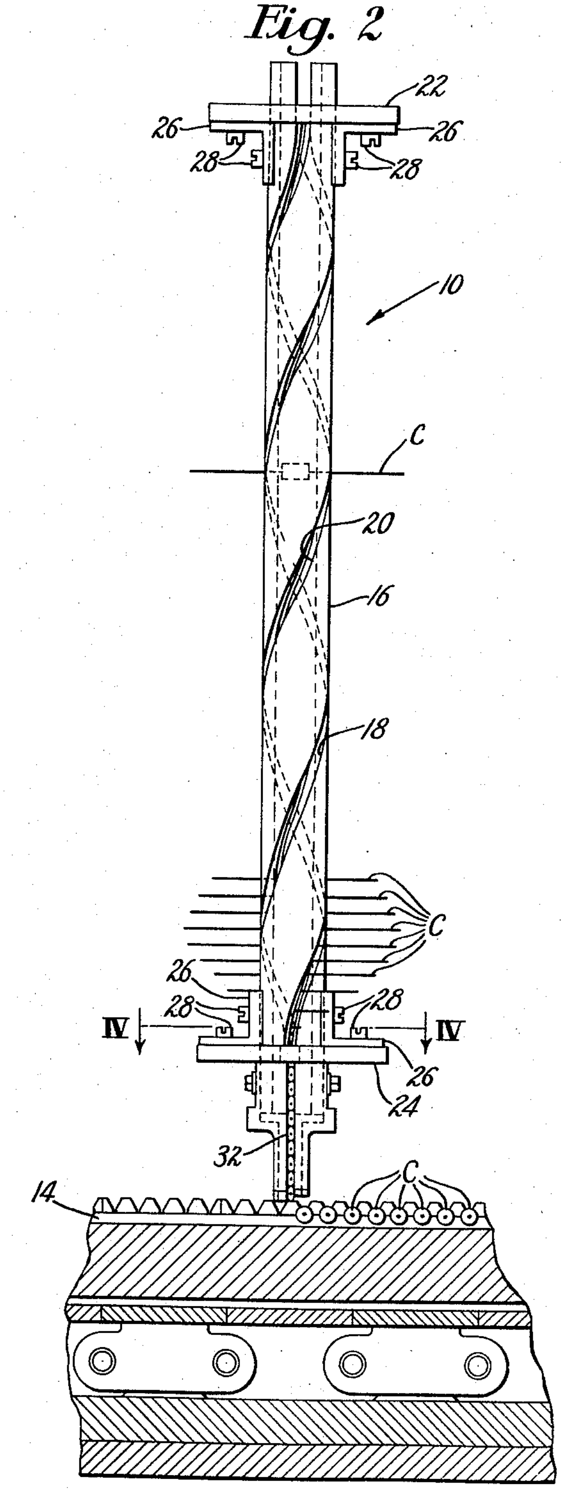
Fig. 2 is a view in elevation and on a larger scale of the raceway shown in Fig. 1 and mounted vertically over a component conveyor mechanism.
Figure 3:
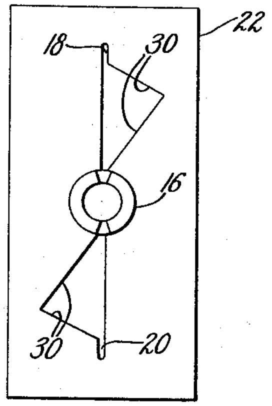
Fig. 3 is a plan view of an upper end portion of the raceway shown in Figs. 1 and 2.
Figure 4:
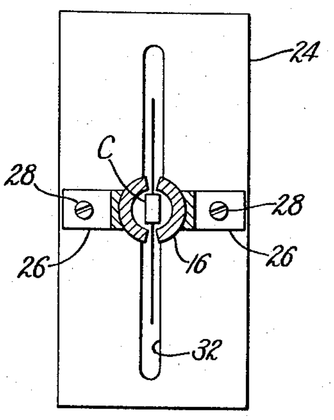
Fig. 4 is a section taken on the line IV—IV of Fig. 2.

The illustrative raceway, generally designated 10, is shown in Fig. 1 as fixedly mounted on a head of a component inserting machine 12 of the type disclosed in a copending application Serial No. 458,312, filed September 27, 1954, in the names of Leon D. Alderman et al. Fig. 2 shows the raceway 10 and coaxial lead electronic components C therein, the raceway being either fixedly or movably mounted for purposes of illustration above a toothed holder 14 adapted to receive the components in a row when fed vertically thereto under the influence of gravity. It will be clear that various modifications may be made in the raceway construction illustrated and in the numerous uses to which it may be put without departing from the scope of this invention. As herein shown the raceway comprises a cylindrical, tubular column 16, the wall of which is provided with similar and oppositely disposed lead guiding slots 18 and 20. These slots are respectively formed with a short, straight upper or loading portion and a short, straight lower or delivery position, and between these end portions the slots extend helically about the axis of the column 16. This column may comprise two pieces formed as a consequence of milling the slots 18 and 20, in a hollow bar having an internal diameter exceeding the dimension of the bodies of the components to be fed, as measured in the direction in which their leads extend. These pieces are secured in operative relation by means of upper and lower plates 22 (Fig. 3), 24 (Fig. 4) to which the pieces are affixed by brackets 26 (Fig. 2) and screws 28.

The upper plate 22 is provided with a splayed opening 30 through which the column 16 extends and through which successive components are to be deposited for loading of the raceway. Reloading need not be done until the uppermost component in the raceway has descended to the bottom of the helical slots 18, 20, and it may then be accomplished by manually inserting the components through the opening 30 one by one, or by allowing successive tape or card-mounted components to slide from their mounting into the opening.

Though not essential, a straight slotted portion 32 at the delivery end of the column may be in continuation of the slots 18, 20 for guiding the components in stacked alinement into either a common type of inclined raceway 34 (Fig. 1), to other conveyor means such as the holder 14 (Fig. 2) or directly to cutting, forming or other instrumentalities not shown.

It is found that even though leads are bent to some extent the components inserted in the opening 30 will fall without interruption in the column 16 and with little or no tendency to jam. Advantageously, the leads need not be exactly horizontal when being loaded. Their normal condition of passage, indicated by the individually descending component in Fig. 2, is at, or substantially at, right angles to the axis of the column and normal to the direction of feed. By reason of the shape and disposition of the helical slots 18, 20, if one lead of a falling component in the vertical column advances in its slot ahead of the other lead in its slot, it appears that said one lead will be subjected by the upper and lower surfaces of its slot to retarding friction and possibly momentary cramping action and, in effect, offered resistance to feeding tending to bend it. Moreover, this retarding resistance on a lead progressively increases the more it advances ahead of the lagging lead, and thus the helical raceway provides a leveling effect tending to restore each component to its normal condition of passage. Accordingly, a falling component may tilt and rock within limits as it descends, but descent is continuous. If a component body happens to be not much shorter than the internal diameter of the vertical column, that end of the body adjacent to the leading tilting lead may contact the inner wall of the column to provide added corrective friction tending to return the component to normal horizontal condition.

Figure 5:
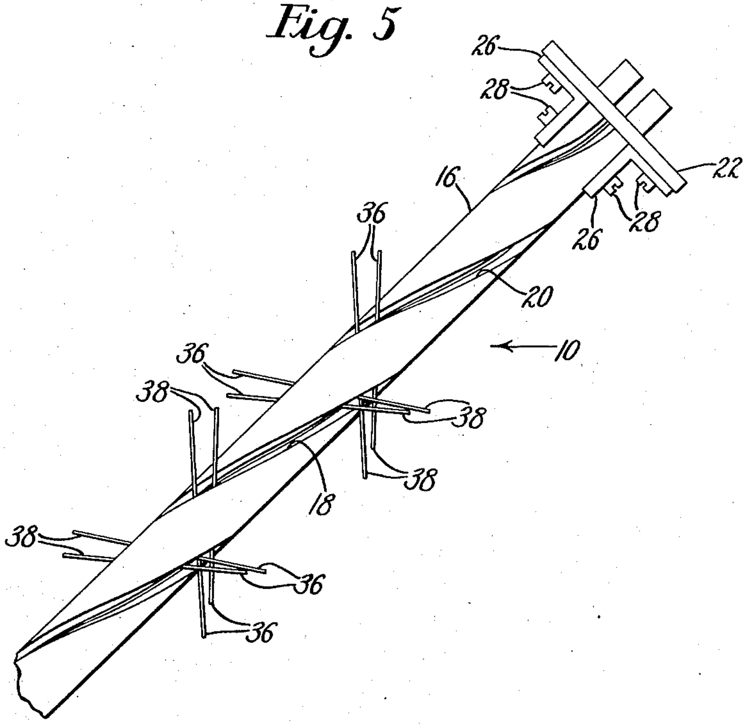
Fig. 5 is a view in elevation of a portion of a raceway such as that shown in Figs. 1 and 2, but illustrating how components travel in this raceway when it is mounted with inclination.

When the illustrative raceway 10 is mounted with its axis inclined to the vertical, for instance at 45°, as shown in Fig. 5, it is found that no difficulty is experienced in feeding the component down the column under gravity either when the column is kept full or when descending singly in a nearly empty column. When kept full, the components in the inclined column are so positioned that their axes are substantially normal to the axis of the column, but when singly falling therein a component is found to assume successive conditions in which first one then the other of its leads is in advance, the component appearing to rock upon each end of its body alternately as its axis approaches a vertical position. Fig. 5 shows eight selected positions assumed by a component as it progresses freely down the inclined column, its leads being identified as 36, 38.

Having thus described my invention, what I claim as new and desire to secure by Letters Patent of the United States is:

1. A raceway for feeding electrical components of the type having a body and a lead extending axially from each end of the body, said raceway including a tubular column having a length and an internal diameter adapted to accommodate a plurality of transversely disposed component bodies therein, the wall of said column being formed with a pair of similar slots inclined to the central axis of the column, and said slots being disposed to receive the respective leads of each component as it is caused to turn about said axis in being fed through the column.

2. The method of making a combination reservoir and raceway for articles having slender projecting portions extending from opposite ends of their bodies which consists in providing a tubular bar of stock, the internal diameter of said bar being greater than the dimension of the bodies to be fed therein as measured between said ends, dividing the bar into two pieces by forming it with a pair of helical, longitudinally extending slots, said slots being oppositely disposed and similarly inclined with respect to the axis of the bar and having a width adapted slidingly to accommodate the projecting portions, respectively, and then securing the two pieces in their prior columnar relation for axial reception and feeding of the articles.

3. A raceway for co-axial lead components comprising a tube having a cylindrical wall, said wall being formed with a pair of helical lead-receiving slots of like pitch and respectively disposed longitudinally of the tube to be intersected by a common plane passing through the longitudinal axis of the tube at equidistant and diametrically opposed points.

4. A raceway for co-axial lead components comprising a tubular column for receiving the bodies of the components, said column being formed with a pair of helically disposed slots for receiving the leads respectively of each component, said slots being disposed to be intersected at points spaced 180° circumferentially by a plane containing the longitudinal axis of the column, the surface of one of said slots being disposed to constrain the feeding movement of one of said leads of each component and the surface of the other of said slots being disposed to constrain the feeding movements of the other of said leads of each component, the spacing of the edges of the respective slots being adapted to enable the leads extending therethrough to advance under the influence of gravity in uninterrupted succession.

References Cited in the file of this patent

UNITED STATES PATENTS 2,699,094 Musser ---------------- Jan. 11, 1955